US012547091B2

(12) United States Patent
Isono et al.

(10) Patent No.: US 12,547,091 B2
(45) Date of Patent: Feb. 10, 2026

(54) TONER

(71) Applicant: CANON KABUSHIKI KAISHA, Tokyo (JP)

(72) Inventors: Naoya Isono, Shizuoka (JP); Takayuki Toyoda, Shizuoka (JP); Hirofumi Kyuushima, Tokyo (JP); Tomoya Nagaoka, Tokyo (JP); Masao Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 729 days.

(21) Appl. No.: 17/804,882

(22) Filed: Jun. 1, 2022

(65) Prior Publication Data

US 2022/0390871 A1 Dec. 8, 2022

(30) Foreign Application Priority Data

Jun. 8, 2021 (JP) ................................ 2021-095999

(51) Int. Cl.
*G03G 9/097* (2006.01)
*G03G 9/087* (2006.01)

(52) U.S. Cl.
CPC ....... *G03G 9/0975* (2013.01); *G03G 9/08755* (2013.01); *G03G 9/09733* (2013.01)

(58) Field of Classification Search
CPC ............. G03G 9/0975; G03G 9/08755; G03G 9/09733
See application file for complete search history.

(56) References Cited

U.S. PATENT DOCUMENTS 7,141,342 B2 11/2006 Toyoda
7,264,910 B2 9/2007 Toyoda
7,288,357 B2 10/2007 Toyoda
7,482,105 B2 1/2009 Hirose et al.
7,833,685 B2 11/2010 Tanaka
7,833,687 B2 11/2010 Kato
8,211,606 B2 7/2012 Murai
8,367,289 B2 2/2013 Isono
8,377,616 B2 2/2013 Tani
8,440,382 B2 5/2013 Isono
8,497,054 B2 7/2013 Sugiyama
8,507,168 B2 8/2013 Hiraoka et al.
8,557,492 B2 * 10/2013 Hayashi et al. ....... G03G 9/097
8,628,899 B2 1/2014 Kawamura
8,652,737 B2 2/2014 Handa
8,697,327 B2 4/2014 Shibata
8,778,581 B2 7/2014 Nonaka
8,815,484 B2 8/2014 Tanaka
8,916,319 B2 12/2014 Ikeda
8,940,467 B2 1/2015 Hashimoto
9,146,485 B2 9/2015 Tani
9,158,216 B2 10/2015 Shimano
9,377,705 B2 6/2016 Shimano
9,383,668 B2 7/2016 Noji
9,500,972 B2 11/2016 Tanaka
9,556,290 B2 1/2017 Nishiura
9,575,424 B2 2/2017 Nakagawa
9,599,919 B2 3/2017 Isono
9,658,549 B2 5/2017 Tanaka
9,715,187 B2 7/2017 Mukumoto
9,785,068 B2 10/2017 Umeda
9,785,071 B2 10/2017 Shimano
9,829,814 B2 11/2017 Yoshida
9,829,816 B2 11/2017 Tanaka
9,835,964 B2 12/2017 Yoshida
9,857,711 B2 1/2018 Yoshida
9,904,193 B2 2/2018 Nakagawa
9,958,801 B2 5/2018 Tanaka
10,078,279 B2 9/2018 Nakagawa
10,101,681 B2 10/2018 Tagawa
10,151,990 B2 12/2018 Suzuki
10,216,107 B2 2/2019 Tsubaki
10,353,310 B2 * 7/2019 Fujita et al. ........... G03G 9/087
10,670,982 B2 * 6/2020 Yamashita et al. .... G03G 9/087
10,732,529 B2 8/2020 Yoshiba
10,732,530 B2 8/2020 Matsui
(Continued)

FOREIGN PATENT DOCUMENTS

CN 110832406 A 2/2020
EP 1 950 260 A1 7/2008
(Continued)

OTHER PUBLICATIONS

CAB-O-SIL TS 720 Fumed Silica (Year 2024).
Fedor, Robert F., A Method for Estimating Both the Solubility Parameters and Molar Volumes of Liquids, Pol. Eng. Sci., vol. 14, No. 2 (1984) 147-54.
U.S. Appl. No. 17/197,102, Yuujirou Nagashima, filed Mar. 10, 2021.
U.S. Appl. No. 17/660,138, Keisuke Adachi, filed Apr. 21, 2022.
U.S. Appl. No. 17/804,879, Hirofumi Kyuushima, filed Jun. 1, 2022,
U.S. Appl. No. 17/804,880, Tomoya Nagaoka, filed Jun. 1, 2022.
U.S. Appl. No. 17/804,883, Takayuki Toyoda, filed Jun. 1, 2022.
U.S. Appl. No. 17/805,357, Kenji Aoki, filed Jun. 3, 2022.

* cited by examiner

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, wherein
the toner particle further comprises
a monohydric aliphatic alcohol, and
an anionic surfactant having an alkyl group,
the binder resin comprises a polyester resin,
a carbon number of the monohydric aliphatic alcohol is 8 to 18,
a content of the monohydric aliphatic alcohol when extracted from the toner with ethanol is 30 to 300 ppm by mass in the toner, and
a value of a ratio (molar ratio) of the monohydric aliphatic alcohol extracted from the toner with ethanol relative to the anionic surfactant having an alkyl group extracted from the toner with methanol is 0.01 to 0.60.

9 Claims, 2 Drawing Sheets

(56) References Cited

U.S. PATENT DOCUMENTS

| | | | |
|---|---|---|---|
| 10,747,136 | B2 | 8/2020 | Kenmoku |
| 10,795,275 | B1 | 10/2020 | Srinivasan et al. |
| 10,877,388 | B2 | 12/2020 | Aoki |
| 10,877,389 | B2 | 12/2020 | Kamikura |
| 10,948,839 | B2 | 3/2021 | Tsubaki |
| 11,079,695 | B2 | 8/2021 | Sato |
| 11,086,242 | B2 | 8/2021 | Isono |
| 11,099,493 | B2 | 8/2021 | Komiya |
| 11,112,708 | B2 | 9/2021 | Uratani |
| 11,181,844 | B2 | 11/2021 | Nagaoka |
| 11,181,845 | B2 | 11/2021 | Shimoda |
| 11,249,412 | B2 | 2/2022 | Kawamura |
| 11,262,666 | B2 | 3/2022 | Yoshiba |
| 11,287,758 | B2 | 3/2022 | Matsui |
| 11,397,386 | B2 | 7/2022 | Kyuushima |
| 2005/0069802 | A1 | 3/2005 | Hirose et al. |
| 2006/0177754 | A1 | 8/2006 | Miyakawa et al. |
| 2007/0111124 | A1 | 5/2007 | Yuasa |
| 2008/0299482 | A1 | 12/2008 | Kato |
| 2010/0035171 | A1 | 2/2010 | Watanabe |
| 2010/0159381 | A1 | 6/2010 | Takagi et al. |
| 2011/0123917 | A1 | 5/2011 | Hayashi et al. |
| 2011/0143278 | A1 | 6/2011 | Iftime et al. |
| 2012/0301821 | A1 | 11/2012 | Kim et al. |
| 2013/0202998 | A1 | 8/2013 | Higashi |
| 2013/0252159 | A1 | 9/2013 | Kawakami |
| 2014/0356778 | A1 | 12/2014 | Wolfe et al. |
| 2014/0356779 | A1 | 12/2014 | Hasegawa |
| 2014/0377697 | A1 | 12/2014 | Nishiura |
| 2015/0004539 | A1 | 1/2015 | Watanabe |
| 2019/0040423 | A1 | 2/2019 | Noba et al. |
| 2019/0107792 | A1 | 4/2019 | Koyama et al. |
| 2019/0258186 | A1 | 8/2019 | Yamashita et al. |
| 2020/0103776 | A1 | 4/2020 | Kinumatsu et al. |
| 2020/0292956 | A1 | 9/2020 | Amano et al. |
| 2020/0341395 | A1 | 10/2020 | Ookubo |
| 2021/0132519 | A1 | 5/2021 | Hashimoto |
| 2021/0141317 | A1 | 5/2021 | Wakabayashi et al. |
| 2021/0165364 | A1 | 6/2021 | Kinumatsu et al. |
| 2021/0286281 | A1 | 9/2021 | Nishikawa |
| 2021/0286283 | A1 | 9/2021 | Nagaoka |
| 2021/0294238 | A1 | 9/2021 | Hashimoto |
| 2021/0302856 | A1 | 9/2021 | Nagashima |
| 2021/0311405 | A1 | 10/2021 | Shiotari |
| 2021/0318631 | A1 | 10/2021 | Isono |
| 2021/0405549 | A1 | 12/2021 | Ookubo |
| 2022/0075284 | A1 | 3/2022 | Nakayama |
| 2022/0128915 | A1 | 4/2022 | Toyoda |
| 2022/0128919 | A1 | 4/2022 | Kawamura |
| 2022/0146953 | A1 | 5/2022 | Kyuushima |
| 2022/0146954 | A1 | 5/2022 | Kato |
| 2022/0390871 | A1 | 12/2022 | Isono et al. |

FOREIGN PATENT DOCUMENTS

| | | | |
|---|---|---|---|
| JP | 8-160660 | A | 6/1996 |
| JP | 2000-35692 | A | 2/2000 |
| JP | 2003-255586 | A | 9/2003 |
| JP | 2006-201563 | A | 8/2006 |
| JP | 2008-102396 | A | 5/2008 |
| JP | 2008-233567 | A | 10/2008 |
| JP | 2010-145946 | A | 7/2010 |
| JP | 4662475 | B2 | 3/2011 |
| JP | 2011-215311 | A | 10/2011 |
| JP | 2012-208219 | A | 10/2012 |
| JP | 2013-519116 | A | 5/2013 |
| JP | 2013-205593 | A | 10/2013 |
| JP | 2014-211560 | A | 11/2014 |
| JP | 2015-152784 | A | 8/2015 |
| JP | 2016-218208 | A | 12/2016 |
| JP | 2017-167524 | A | 9/2017 |
| JP | 2018-84774 | A | 5/2018 |
| JP | 2019045524 | A | 3/2019 |
| JP | 2019-144437 | A | 8/2019 |
| JP | 2020-56914 | A | 4/2020 |
| JP | 2020-148928 | A | 9/2020 |

TONER

BACKGROUND OF THE INVENTION

Field of the Invention

The present disclosure relates to a toner used in order to form a toner image through development of an electrostatic latent image formed using an electrophotography method, an electrostatic recording method, a toner jet method, or the like.

Description of the Related Art

Over the years, there have been increasing demands from users for development in electrophotography techniques accompanied by further development in apparatuses used in reception equipment such as copiers, printers and fax machines. The developments in recent years have included compact designs so that apparatuses can be installed anywhere, and there have been strong demands for stable image quality in a variety of environments, regardless of the environment in which an apparatus is used.

From the perspective of compact design, tests have been carried out in order to achieve a reduction in size by, for example, simplifying or making less complex fixing members such as hot rollers and films used for fixing a toner image on a transfer material. Because fixing has to be possible without subjecting fixing members to excessive heat in this method, a toner needs to exhibit excellent low-temperature fixability, and polyester resins, which exhibit excellent low-temperature fixability, are often used in binder resins. However, polyester resins are poor in terms of charging performance in comparison with styrene-acrylic copolymers, which are also often used in binder resins of toners, and therefore suffer from problems such as image defects attributed to charge leakage readily occurring.

In order to solve this problem, Japanese Patent Application Publication No. 2012-208219, for example, discloses a black toner obtained using a naphthalene sulfonic acid formalin condensate and an anionic surfactant having a sulfonic group or a sulfuric acid ester group.

SUMMARY OF THE INVENTION

However, from the perspective of providing stable image quality regardless of environment, it has been found that when this toner is used, charge rising performance is insufficient in high humidity environments, and image-density irregularities occur. Compact designs are demanded by the market, but a variety of toner properties still need to be improved in order to provide an image forming apparatus able to achieve stable image quality regardless of usage environment.

The present disclosure provides a toner which exhibits satisfactory low-temperature fixability, favorable storability, improved charge rising performance in high temperature high humidity environments and excellent developing performance so that image-density irregularities are suppressed.

A toner comprising a toner particle comprising a binder resin, wherein the toner particle further comprises a monohydric aliphatic alcohol, and an anionic surfactant having an alkyl group, the binder resin comprises a polyester resin, a carbon number of the monohydric aliphatic alcohol is 8 to 18, a content of the monohydric aliphatic alcohol when extracted from the toner with ethanol is 30 to 300 ppm by mass in the toner, and a value of a ratio (molar ratio) of the monohydric aliphatic alcohol extracted from the toner with ethanol relative to the anionic surfactant having an alkyl group extracted from the toner with methanol is 0.01 to 0.60.

The present disclosure can provide a toner which exhibits satisfactory low-temperature fixability, favorable storability, improved charge rising performance in high temperature high humidity environments and excellent developing performance so that image-density irregularities are suppressed. Further features of the present invention will become apparent from the following description of exemplary embodiments with reference to the attached drawings.

DESCRIPTION OF THE EMBODIMENTS

Unless otherwise specified, the description of "from XX to YY" or "XX to YY" indicating a numerical range means a numerical range including a lower limit and an upper limit which are endpoints. When a numerical range is described in stages, the upper and lower limits of each numerical range can be combined arbitrarily. The term "monomer unit" means a reacted form of a monomer substance in a polymer.

The present disclosure relates to a toner comprising a toner particle comprising a binder resin, wherein the toner particle further comprises a monohydric aliphatic alcohol, and an anionic surfactant having an alkyl group, the binder resin comprises a polyester resin, a carbon number of the monohydric aliphatic alcohol is 8 to 18, a content of the monohydric aliphatic alcohol when extracted from the toner with ethanol is 30 to 300 ppm by mass in the toner, and a value of a ratio (molar ratio) of the monohydric aliphatic alcohol extracted from the toner with ethanol relative to the anionic surfactant having an alkyl group extracted from the toner with methanol is 0.01 to 0.60.

The inventors of the present invention found that the toner mentioned above exhibits satisfactory low-temperature fixability, favorable storability, improved charge rising performance in high temperature high humidity environments and excellent developing performance so that image-density irregularities are suppressed. The inventors of the present invention assume that the detailed mechanism for this is as follows.

Figure 1:
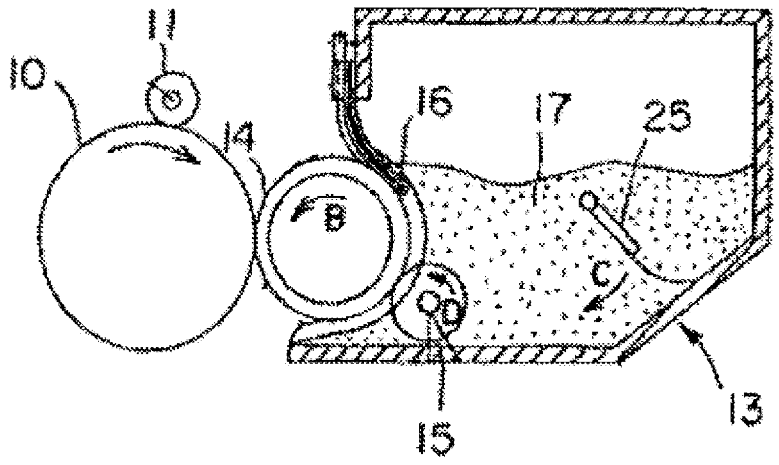
FIG. 1 is a cross-sectional view of a process cartridge.

In a process cartridge such as that shown in FIG. 1, a toner is charged by rubbing between a toner carrying member 14 and a regulating blade 16. In a printed portion, a toner 17 is developed from the toner carrying member 14 to an electrostatic latent image bearing member 10, and fresh toner is supplied to the toner carrying member 14 from a toner feeding member 15. However, in a non-printed portion, the toner is not consumed and remains on the toner carrying member 14. Therefore, there is difference in charge quantity between the remaining toner and freshly supplied toner, and image-density irregularities occur.

Reference symbols in FIG. 1 are as follows.

10: electrostatic latent image bearing member, 11: charging roller, 14: toner carrying member, 15: toner feeding member, 16: regulating blade, 17: toner, 13: toner container, 25: stirring unit As mentioned above, a toner that contains a binder resin containing a polyester resin exhibits excellent low-temperature fixability, but is inferior in terms of charging performance to a toner in which a styrene-acrylic copolymer is used as a binder resin. In a case where an anionic surfactant in particular is used as a charge generation source, adsorption of moisture by the anionic surfactant in a high humidity environment means that charge leakage tends to occur, charge rising performance of the toner decreases, and image-density irregularities tend to occur.

The matter that a monohydric aliphatic alcohol is extracted from the toner with ethanol shows that the monohydric aliphatic alcohol is present close to the toner surface. By causing the monohydric aliphatic alcohol to be present close to the toner surface, it is possible to cause water molecules that had been adsorbed on the anionic surfactant to move to hydroxyl groups in the aliphatic alcohol, which exhibits higher affinity for water. As a result, it is possible to suppress a decrease in charging performance of the anionic surfactant caused by water molecules. Furthermore, hydroxyl groups in the aliphatic alcohol reach a state of equilibrium with water molecules due to hydrogen bonding, and hydroxyl groups in the monohydric alcohol become polarized and charged. As a result, it is thought that charge rising performance is improved in high humidity environments and image-density irregularities are suppressed.

The monohydric aliphatic alcohol must have 8 to 18 carbon atoms. If the number of carbon atoms is fewer than 8, the alcohol is gradually lost from the system and a lasting effect is unlikely to be achieved. If the number of carbon atoms is more than 18, affinity for the binder resin increases, the binder resin plasticizes, and storability tends to decrease. The number of carbon atoms is preferably 10 to 16, and more preferably 12 to 14. The monohydric aliphatic alcohol may be straight chain or branched, but is preferably straight chain.

The content of the monohydric aliphatic alcohol extracted from the toner with ethanol must be from 30 ppm by mass to 300 ppm by mass relative to the mass of the toner. If the amount of monohydric aliphatic alcohol extracted from the toner with ethanol is less than 30 ppm by mass, the advantageous effect mentioned above is unlikely to be achieved and image-density irregularities tend to occur as a result of insufficient charge rising performance. If this amount of aliphatic alcohol is more than 300 ppm by mass, the amount of moisture adsorbed by the toner greatly increases, charge leakage preferentially occurs over hydroxyl groups becoming charged through polarization, and fogging tends to occur. In addition, because charge rising performance decreases, image-density irregularities tend to occur. This amount is preferably from 40 ppm by mass to 270 ppm by mass, more preferably from 50 ppm by mass to 250 ppm by mass, and further preferably from 80 ppm by mass to 200 ppm by mass.

The value of the ratio of the monohydric aliphatic alcohol extracted from the toner with ethanol relative to the anionic surfactant having an alkyl group extracted from the toner with methanol (alcohol/surfactant molar ratio) must be from 0.01 to 0.60. If this molar ratio is less than 0.01, the amount of the monohydric aliphatic alcohol relative to the anionic surfactant is low, and the advantageous effect mentioned above is unlikely to be achieved. If this molar ratio is more than 0.60, the balance between charging and leakage is lost, and fogging tends to occur. This value is preferably from 0.02 to 0.45, and more preferably from 0.03 to 0.40.

Examples of the anionic surfactant having an alkyl group include sulfuric acid ester-based, sulfonate-based and phosphoric acid ester-based surfactants. The number of carbon atoms in the alkyl group is preferably 8 to 18, more preferably 10 to 16, and further preferably 12 to 16. The alkyl group may be straight chain or branched, but is preferably straight chain. The anionic surfactant having an alkyl group is preferably represented by formula (A) below:

$$R—X—SO_3^-Na^+ \quad (A)$$

where, in the formula, R is an alkyl group having 8 to 18 carbon atoms (preferably 10 to 16 carbon atoms, and more preferably 12 to 16 carbon atoms). The alkyl group may be straight chain or branched, but is preferably straight chain. X is a single bond, —O—, a phenylene group or $—(OCH_2CH_2)_n—$ (n is 2 to 10, more preferably 2 to 6, and further preferably 2 to 4).

The content of the anionic surfactant having an alkyl group extracted from the toner with methanol is preferably from 1000 ppm by mass to 25,000 ppm by mass, and more preferably from 1500 ppm by mass to 10,000 ppm by mass, relative to the mass of the toner.

Of these, a sulfonate-based surfactant is preferred, and the anionic surfactant having an alkyl group more preferably contains a sodium straight chain alkylbenzene sulfonate. Here, the difference between the number of carbon atoms in the alkyl group of the sodium straight chain alkylbenzene sulfonate and the number of carbon atoms in the monohydric aliphatic alcohol is preferably 3 or less, and more preferably 2 or less. The lower limit of this difference is not particularly limited, but is 0 or more. Because the sodium straight chain alkylbenzene sulfonate and the monohydric aliphatic alcohol have alkyl groups of approximately the same length, intermolecular interactions are strong, the two components are drawn to each other, and the advantageous effect mentioned above is more likely to be achieved.

The polyester resin is preferably a condensation polymerization product of a polycarboxylic acid shown below and a polyhydric alcohol shown below.

Examples of the polycarboxylic acid include aliphatic dicarboxylic acids (oxalic acid, malonic acid, maleic acid, fumaric acid, citraconic acid, itaconic acid, glutaconic acid, succinic acid, alkenylsuccinic acids, adipic acid, sebacic acid, and the like), alicyclic dicarboxylic acids (cyclohexanedicarboxylic acid and the like), aromatic dicarboxylic acids (terephthalic acid, isophthalic acid, phthalic acid, naphthalenedicarboxylic acid, and the like), and anhydrides of these.

A combination of a dicarboxylic acid and a trihydric or higher carboxylic acid having a crosslinked structure or branched structure may be used as the polycarboxylic acid. Examples of the trihydric or higher carboxylic acid include trimellitic acid, pyromellitic acid, and anhydrides of these.

It is possible to use one of these polycarboxylic acids in isolation or a combination of two or more types thereof.

Examples of the polyhydric alcohol include aliphatic diols (ethylene glycol, diethylene glycol, triethylene glycol, propylene glycol, butane diol, hexane diol, neopentyl glycol, and the like), alicyclic diols (cyclohexane diol, cyclohexane dimethanol, hydrogenated bisphenol A, and the like), aromatic diols (bisphenol A, alkylene oxide adducts thereof, and the like) and heterocyclic diols (spiroglycol, isosorbide, alkylene oxide adducts thereof, and the like).

A combination of a diol and a trihydric or higher polyhydric alcohol having a crosslinked structure or branched structure may be used as the polyhydric alcohol. Examples of the trihydric or higher polyhydric alcohol include glycerin, trimethylolpropane and pentaerythritol. It is possible to use one of these polyhydric alcohols in isolation, or a combination of two or more types thereof.

The polyester resin is preferably a condensation polymerization product of an aromatic dicarboxylic acid, a trihydric or higher carboxylic acid, an aliphatic diol, an aromatic diol and a heterocyclic diol. The polyester resin preferably has a monomer unit derived from isosorbide represented by formula (I) below. The content of the monomer unit represented by formula (I) in the polyester resin is preferably 15 to 40 mass %, and more preferably 20 to 35 mass %.

(I)

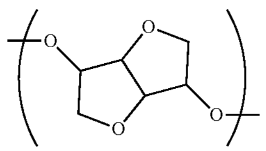

The polyester resin preferably has a monomer unit represented by formula (1) below. From the perspective of fixing performance, the content of the monomer unit represented by formula (1) in the polyester resin is preferably 5.0 mass % or less, and more preferably 4.5 mass % or less. The lower limit for this content is not particularly limited, but is preferably 1.0 mass % or more, and more preferably 3.0 mass % or more.

(1)

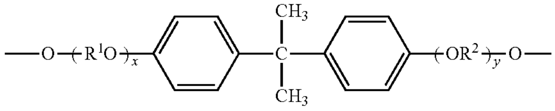

In formula (1), $R^1$ and $R^2$ are each independently an ethylene group or a propylene group, x and y denote the average added number of moles of an alkylene oxide, and are each 0 to 8 (preferably 1 to 6, and more preferably 2 to 5), and the sum of x and y is 0 to 16.

The content of the polyester resin in the binder resin is preferably 50 mass % or more, more preferably 60 mass % or more, further preferably 70 mass % or more, and further preferably 80 mass % or more. The upper limit for this content is not particularly limited, but is preferably 98 mass % or less, and more preferably 95 mass % or less.

The weight average molecular weight Mw of the polyester resin is preferably 20,000 to 300,000. This weight average molecular weight is more preferably 30,000 to 200,000, further preferably 40,000 to 100,000, and further preferably 40,000 to 60,000.

Binder Resin

The binder resin may also contain another resin if a polyester is contained. For example, it is possible to use the following resins.

Homopolymers of styrene and substituted styrene compounds, such as polystyrene, poly-p-chlorostyrene and poly (vinyl toluene); styrene-based copolymers such as styrene-p-chlorostyrene copolymers, styrene-vinyl toluene copolymers, styrene-vinyl naphthalene copolymers, styrene-acrylic acid ester copolymers, styrene-methacrylic acid ester copolymers, styrene-α-chloromethyl methacrylate copolymers, styrene acrylonitrile copolymers, styrene-vinyl methyl ether copolymers, styrene-vinyl ethyl ether copolymers, styrene-vinyl methyl ketone copolymers and styrene-acrylonitrile-indene copolymers; poly(vinyl chloride), phenolic resins, natural resin-modified phenolic resins, natural resin-modified maleic acid resins, acrylic resins, methacrylic resins, poly(vinyl acetate) resins, silicone resins, amorphous polyester resins, crystalline polyester resins, polyurethane resins, polyamide resins, furan resins, epoxy resins, xylene resins, poly(vinyl butyral) resins, terpene resins, cumarone-indene resins and petroleum-based resins.

The binder resin preferably contains a styrene-acrylic resin such as a styrene-acrylic acid ester copolymer or a styrene-methacrylic acid ester copolymer. The styrene-acrylic resin is preferably obtained by using a styrene-based monomer shown below and an unsaturated carboxylic acid ester shown below. The content of the styrene-acrylic resin in the binder resin is preferably 2 to 40 mass %, and more preferably 5 to 20 mass %.

Examples of polymerizable monomers able to form the styrene-acrylic resin include styrene-based monomers such as styrene, α-methylstyrene and divinylbenzene; unsaturated carboxylic acid esters (for example, (meth)acrylic acid esters having an alkyl group with 1 to 8 carbon atoms) such as methyl acrylate, butyl acrylate, methyl methacrylate, 2-hydroxyethyl methacrylate, t-butyl methacrylate and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile-based vinyl monomers such as acrylonitrile; halogen-based vinyl monomers such as vinyl chloride; and nitro-based vinyl monomers such as nitrostyrene.

Colorant

The toner particle preferably contains a colorant. Examples of the colorant include those listed below. Examples of black colorants include carbon black; and materials that are colored black through use of yellow colorants, magenta colorants and cyan colorants. A pigment may be used alone as a colorant.

Examples of pigments for magenta toners include those listed below. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35. Examples of dyes for magenta toners include those listed below. Oil-soluble dyes such as C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39 and 40; and C.I. Basic Violet 1, 3, 7, 10, 14, 15, 21, 25, 26, 27 and 28.

Examples of pigments for cyan toners include those listed below. C.I. Pigment Blue 2, 3, 15:2, 15:3, 15:4, 16 and 17; C.I. Vat Blue 6; C.I. Acid Blue 45, and copper phthalocyanine pigments in which 1 to 5 phthalimidomethyl groups in the phthalocyanine skeleton are substituted. An example of a dye for a cyan toner is C.I. Solvent Blue 70. Examples of pigments for yellow toners include those listed below. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20. An example of a dye for yellow toner is C.I. Solvent Yellow 162.

The content of the colorant is preferably from 0.1 parts by mass to 30.0 parts by mass relative to 100.0 parts by mass of the binder resin.

Wax

The toner particle preferably contains a wax. The wax is not particularly limited, but examples thereof include the following.

Hydrocarbon waxes such as low molecular weight polyethylene, low molecular weight polypropylene, alkylene copolymers, microcrystalline waxes, paraffin waxes and Fischer Tropsch waxes; oxides of hydrocarbon waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax.

Further examples include the types listed below. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid and alcohols such as stearyl alcohol, aralkyl alcohols, behenyl alcohol, carnaubyl alcohol, ceryl alcohol and melissyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyladipic acid amide and N,N'-dioleylsebacic acid amide; aromatic bisamides such as m-xylene bis-stearic acid amide and N,N'-distearylisophthalic acid; fatty acid metal salts (commonly known as metal soaps) such as calcium stearate, calcium laurate, zinc stearate and magnesium stearate; waxes obtained by grafting vinyl monomers such as styrene and acrylic acid onto aliphatic hydrocarbon-based waxes; partial esters of fatty acids and polyhydric alcohols, such as behenic acid monoglyceride; and hydroxyl group-containing methyl ester compounds obtained by hydrogenating plant-based oils and fats.

Of these waxes, hydrocarbon waxes, such as paraffin waxes and Fischer Tropsch waxes, and ester waxes are preferred from the perspectives of improving low-temperature fixability and resistance to fixing wraparound. The wax content is preferably from 0.5 parts by mass to 25.0 parts by mass relative to 100.0 parts by mass of the binder resin.

In addition, from the perspective of achieving a balance between toner storability and hot offset resistance, it is preferable for the peak temperature of a maximum endothermic peak of the wax to be from 50° C. to 110° C. within a temperature range of from 30° C. to 200° C. on a rising temperature endothermic curve measured by means of differential scanning calorimetry (DSC).

Charge Control Agent

The toner can contain a charge control agent if necessary. As the charge control agent, known ones can be used. The charge control agent may be internally or externally added to the toner particle. The addition of the charge control agent is preferably from 0.2 parts by mass to 10.0 parts by mass relative to 100.0 parts by mass of the binder resin.

Carrier

The toner may be used as a single-component developer. From the perspective of being able to achieve stable images over a long period of time, the toner may be mixed with a magnetic carrier and used as a two component developer. Publicly known magnetic carriers such as those listed below can be used. For example, surface-oxidized iron powders, unoxidized iron powders; particles of a metal such as iron, lithium, calcium, magnesium, nickel, copper, zinc, cobalt, manganese, chromium or a rare earth element, or particles of alloys or oxides of these metals; a magnetic material such as ferrite; or a magnetic material-dispersed resin carrier (a so-called resin carrier) that contains a magnetic material and a binder resin that holds the magnetic material in a dispersed state.

In cases where the toner is used as a two component developer by being mixed with a magnetic carrier, the blending proportion of the carrier in the two component developer is such that the concentration of the toner in the two component developer is preferably from 2 mass % to 15 mass %, and more preferably from 4 mass % to 13 mass %.

Toner Production Method

The method for producing the toner particle is not particularly limited as long as this is a conventional well-known method, such as an emulsion aggregation method, a pulverization method or a dissolution suspension method. Of these, the toner particle may be obtained using an emulsion aggregation method.

Specifically, in a case where the toner particle is produced using an emulsion aggregation method, the toner particle is produced by carrying out: a step for using an anionic surfactant having an alkyl group to prepare a resin particle-dispersed solution in which resin particles that serve as the binder resin are dispersed; a step for forming aggregated particles by aggregating resin particles in a dispersed solution obtained by mixing the resin particle-dispersed solution with the monohydric aliphatic alcohol, the anionic surfactant having an alkyl group and, if necessary, dispersed solutions of other particles such as a colorant and a wax; and a step for obtaining a toner particle by heating the aggregated particle-dispersed solution, in which aggregated particles are dispersed, and fusing/coalescing the aggregated particles. In the explanation given below, a method for obtaining a toner particle that contains a colorant and a wax is explained, but other additives in addition to the colorant and wax may be used.

Resin Particle-Dispersed Solution Preparation Step

A resin particle-dispersed solution in which resin particles that serve as the binder resin are dispersed, a colorant particle-dispersed solution in which colorant particles are dispersed, and a wax particle-dispersed solution in which wax particles are dispersed are prepared. Here, the resin particle-dispersed solution is prepared by dispersing resin particles in a dispersion medium using a surfactant. An aqueous medium can be given as an example of the dispersion medium used in the resin particle-dispersed solution. Examples of the aqueous medium include water, such as distilled water and ion exchanged water. A combination of these may be used.

It is possible to incorporate an anionic surfactant in the toner by using an anionic surfactant having an alkyl group mentioned above as the surfactant. In addition to an anionic surfactant, it is possible to additionally use a cationic surfactant such as an amine salt type surfactant or a quaternary ammonium salt type surfactant; or a non-ionic surfactant such as a polyethylene glycol-based surfactant, an alkylphenol ethylene oxide adduct-based surfactant or a polyhydric alcohol-based surfactant. When the resin particle-dispersed solution is produced, it is preferable to produce the resin particle-dispersed solution by polymerizing a polymerizable monomer that produces the binder resin in an aqueous medium to which is added an anionic surfactant having an alkyl group.

Examples of methods for dispersing resin particles in the dispersion medium in the resin particle-dispersed solution include ordinary dispersion methods involving use of a rotating shear type homogenizer or a media-containing ball mill, sand mill, Dynomill, or the like. In addition, depending on the type of resin particles, the resin particles may be dispersed in the resin particle-dispersed solution using a phase inversion emulsification method or the like.

The volume average particle diameter of resin particles dispersed in the resin particle-dispersed solution is preferably from 0.01 μm to 1 μm, more preferably from 0.08 μm to 0.8 μm, and further preferably from 0.1 μm to 0.6 μm. The content of resin particles contained in the resin particle-dispersed solution is preferably from 5 mass % to 50 mass %, and more preferably from 10 mass % to 40 mass %. The colorant particle-dispersed solution and wax particle-dispersed solution are also prepared in the same way as the resin particle-dispersed solution.

Aggregated Particle Formation Step

Next, the resin particle-dispersed solution, the monohydric aliphatic alcohol, the anionic surfactant having an alkyl group and, if necessary, the colorant particle-dispersed solution and the wax particle-dispersed solution are mixed. In this mixed dispersed solution, the resin particles (and the colorant particles and the wax particles) undergo hetero-aggregation to form aggregated particles which have diameters close to the target toner particle diameter and which contain the resin particles (and the colorant particles and the wax particles).

Specifically, aggregated particles are formed by, for example, adding an aggregating agent to the mixed dispersed solution, adjusting the pH of the mixed dispersed solution to an acidic pH (for example, a pH of from 2 to 5), adding a dispersion stabilizer if necessary, heating to a temperature that is not higher than the glass transition temperature of the resin particles (specifically, a temperature that is, for example, not lower than 30° C. lower than the glass transition temperature of the resin particles and not higher than 10° C. lower than the glass transition temperature of the resin particles), thereby aggregating particles dispersed in the mixed dispersed solution.

Examples of the aggregating agent include inorganic metal salts and divalent or higher metal complexes. If necessary, it is possible to use an additive that forms a complex or similar bond with the metal ion of the aggregating agent. A chelating agent can be advantageously used as this additive.

Examples of inorganic metal salts include metal salts such as calcium chloride, calcium nitrate, barium chloride, magnesium chloride, zinc chloride, aluminum chloride and aluminum sulfate; and inorganic metal salt polymers such as polyaluminum chloride, polyaluminum hydroxide and calcium polysulfide.

A water-soluble chelating agent may be used as the chelating agent. Examples of the chelating agent include oxycarboxylic acids such as tartaric acid, citric acid and gluconic acid; iminodiacetic acid (IDA), nitrilotriacetic acid (NTA) and ethylenediaminetetraacetic acid (EDTA).

Fusion•Coalescence Step

Toner particles are produced by heating the aggregated particle-dispersed solution in which the aggregated particles are dispersed to a temperature that is not lower than the glass transition temperature of the resin particles (a temperature that is at least 10 to 30° C. higher than the glass transition temperature of the resin particles) so as to fuse and coalesce the aggregated particles. Following completion of the fusion coalescence step, the toner particles formed in the solution are subjected to a well-known washing step, solid-liquid separation step and drying step to obtain dried toner particles.

By carrying out displacement washing with ion exchanged water in the washing step, the molar ratio of the monohydric aliphatic alcohol relative to the anionic surfactant can be easily controlled within the range mentioned above. In addition, the solid-liquid separation step is not particularly limited, but suction filtration, pressure filtration, or the like, can be carried out from the perspective of productivity. In addition, the drying step is not particularly limited in terms of method, but freeze drying, flash jet drying, fluidized drying, vibration type fluidized drying, and the like, can be carried out from the perspective of productivity.

Obtained toner particles may be used as-is as a toner. If necessary, an external additive may be added to the toner particles and mixed to obtain a toner. The mixing should be carried out using, for example, a V blender, a Henschel mixer, a Lödige mixer, or the like. Furthermore, coarse toner particles may, if necessary, be removed using a vibrating sieving machine, an air sieving machine, or the like.

Methods for measuring various physical properties will now be explained.

Identification and Quantification of Anionic Surfactant Extracted from Toner with Methanol 1 g of toner is measured out, 10 g of methanol is added, a treatment is carried out for 20 minutes using an ultrasonic cleaner held at a water temperature of 30° C.±2° C., and the surfactant is filtered off and extracted with methanol. Using 10.0 μL of this methanol solution, the content of the surfactant is analyzed using a high performance liquid chromatograph (LaChrom Elite (L-2000 series) chromatograph produced by Hitachi High-Technologies Corporation). The column is a GL Sciences InertSil Ph (5μ)Φ4.6×250 mm, and the column is held at a temperature of 50° C.±1° C. in a column oven. The surfactant is extracted by fractionating at a liquid flow rate of 1.0 mL/min using a mixed solvent comprising 0.1 vol % phosphoric acid/acetonitrile (0.1 vol % phosphoric acid/acetonitrile=80/20 (volume ratio)) as a mobile phase. The detector is a UV detector, and the amount of surfactant is quantified using a calibration curve prepared in advance from absorbance at a wavelength of 224 nm.

The structure of the anionic surfactant is determined by analyzing the extract mentioned above using a FT NMR apparatus (JNM-EX400 (produced by JEOL Ltd.) [$^{1}$H-NMR 400 MHz, $CDCl_3$, room temperature (25° C.)] ($^{13}$C-NMR and so on is also used).

Identification and Quantification of Monohydric Aliphatic Alcohol Extracted from Toner with Ethanol Preparation of Extraction Sample 18 g of ethanol is added to 2 g of toner and homogenized by shaking by hand, and the obtained mixture is then irradiated with ultrasonic waves for 5 minutes. Next, the mixture is left to stand overnight in a constant temperature chamber at 60° C., and then left to stand for 3 days at room temperature. After being left to stand, the supernatant liquid in the sample is collected and filtered using a PTFE syringe filter (pore diameter 250 nm), and the filtrate is used as the extraction sample.

GC/MS Analysis

The GC/MS apparatus is a GC TRACE-1310 (produced by Thermo Scientific), the detector is a MS ISQ LT single quadrupole mass spectrometer (produced by Thermo Scientific), and a TRIPLUS RSH (produced by Thermo Scientific) autosampler is used. Measurements are carried out under the following conditions.

Sample amount: 1 (liquid injection)

Column: HP5-MS (produced by Agilent Technologies)

Length 30 m, internal diameter 0.25 mm, film thickness 0.25 μm

Split ratio: 10

Split flow: 15 mL/min

Injection port temperature: 250° C.

Helium gas flow rate in column: 1.5 mL/min

MS ionization: EI

Column temperature conditions: held at 40° C. for 3 minutes, then increased to 300° C. at 10° C./min, and then held for 10 minutes Ion source temperature: 250° C.

Mass Range: m/z 45 to 1000

Carrier line temperature: 250° C.

Preparation of Calibration Curve

Calibration curve preparation samples are prepared such that the concentration (on a mass basis) of the monohydric aliphatic alcohol in an ethanol solution is 10 ppm, 50 ppm, 100 ppm and 250 ppm. These samples are measured under the conditions mentioned above, and a calibration curve is prepared from the areas of peaks derived from the monohydric aliphatic alcohol. The extraction sample mentioned above is analyzed using the obtained calibration curve, and the content of the monohydric aliphatic alcohol in the toner extracted with ethanol is calculated.

The structure of the monohydric aliphatic alcohol is determined by analyzing the extraction sample mentioned above using a FT NMR apparatus (JNM-EX400 (produced by JEOL Ltd.) [$^1$H-NMR 400 MHz, $CDCl_3$, room temperature (25° C.)] ($^{13}$C-NMR and so on is also used).

The molar ratio of the monohydric aliphatic alcohol relative to the anionic surfactant is calculated on the basis of the content of the monohydric aliphatic alcohol in the toner extracted with ethanol, which is obtained using the method described above, and the content measured using the method described in "Identification and quantification of anionic surfactant in toner".

Identification and Quantification of Binder Resin

Identification of constituent components of the binder resin, and proportions thereof, is carried out using pyrolysis gas chromatography/mass spectrometry (hereinafter referred to as "pyrolysis GC/MS") and NMR.

Types of constituent compound in the binder resin are analyzed using pyrolysis GC/MS. Using the toner as a sample, types of constituent compound are identified by analyzing mass spectra of components of a decomposition product of the binder resin when the toner is pyrolyzed at a temperature of 550 to 700° C. Specific measurement conditions are as follows.

Pyrolysis GC/MS Measurement Conditions

Pyrolysis apparatus: JPS-700 (produced by Japan Analytical Industry Co., Ltd.)

Decomposition temperature: 590° C.

GC/MS apparatus: Focus GC/ISQ (produced by Thermo Fisher)

Column: HP-5MS (length 60 m, internal diameter 0.25 mm, film thickness 0.25 μm)

Injection port temperature: 200° C.

Flow pressure: 100 kPa

Split: 50 mL/min

MS ionization: EI

Ion source temperature: 200° C.

Mass Range: 45 to 650

Next, abundance ratios of identified constituent compounds of the resin are measured and calculated using $^1$H-NMR. Structure determination is carried out using a FT NMR apparatus (JNM-EX400 (produced by JEOL Ltd.) [$^1$H-NMR 400 MHz, $CDCl_3$, room temperature (25° C.)].

Molar ratios of monomer components are determined from integrated values in obtained spectra, and compositional ratios (mass %) are calculated on the basis of these.

Method for Measuring Weight Average Molecular Weight (Mw) of Binder Resin

The weight average molecular weight (Mw) of the binder resin is measured by means of gel permeation chromatography (GPC), in the manner described below.

First, the binder resin is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is prepared so that the concentration of THF-soluble components is approximately 0.8 mass %. Measurements are carried out using this sample solution under the following conditions.

Apparatus: HLC8120 GPC (detector: RI) (produced by Tosoh Corporation)

Column: Combination of Shodex KF-801, 802, 803, 804, 805, 806 and 807 (produced by Showa Denko Kabushiki Kaisha)

Eluant: Tetrahydrofuran (THF)

Flow rate: 1.0 mL/min

Oven temperature: 40.0° C.

Injected amount: 0.10 mL

When calculating the molecular weight of the sample, a molecular weight calibration curve is prepared using standard polystyrene resins (for example, product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Method for Measuring Weight-Average Particle Diameter (D4) of Toner Particles

The weight-average particle diameter (D4) of the toner particles is calculated by carrying out measurements using a precision particle size distribution measuring device which employees a pore electrical resistance method and uses a 100 μm aperture tube (a "Coulter Counter Multisizer 3"® produced by Beckman Coulter) and accompanying dedicated software that is used to set measurement conditions and analyze measured data ("Beckman Coulter Multisizer 3 Version 3.51 produced by Beckman Coulter) (no. of effective measurement channels: 25,000), and then analyzing the measurement data.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

Moreover, the dedicated software was set up as follows before carrying out measurements and analysis. On the "Standard Operating Method (SOM) alteration" screen in the dedicated software, the total count number in control mode is set to 50,000 particles, the number of measurements is set to 1, and the Kd value is set to "standard particle 10.0 μm" (Beckman Coulter). By pressing the threshold value/noise level measurement button, threshold values and noise levels are automatically set. In addition, the current is set to 1600 μA, the gain is set to 2, the electrolyte solution is set to ISOTON II, and the "Flush aperture tube after measurement" option is checked. On the "Screen for converting from pulse to particle diameter" in the dedicated software, the bin interval is set to logarithmic particle diameter, the particle diameter bin is set to 256 particle diameter bin, and the particle diameter range is set to from 2 μm to 60 μm. The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker, and approximately 0.3 mL of the diluted liquid described below is added to the beaker as a dispersing agent.

Diluted liquid: a diluted liquid obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) 3-fold with deionized water (3) A prescribed amount of ion exchanged water is placed in a water bath of the following ultrasonic disperser having an electrical output of 120 W, in which 2 oscillators having an oscillation frequency of 50 kHz are housed so that their phases are staggered by 180°, and approximately 2 mL of the Contaminon N is added to the water bath.

Ultrasonic disperser: Ultrasonic Dispersion System Tetora 150 produced by Nikkaki Bios Co., Ltd.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 15° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight-average particle diameter (D4).

WORKING EXAMPLES

The present invention will now be explained in further detail through the use of working examples. However, the present invention is not limited to the working examples given below. Moreover, numbers of parts in the working examples and comparative examples are all based on masses, unless explicitly stated otherwise.

Production of Polyester Resin 1

100.0 parts of terephthalic acid, 3.3 parts of trimellitic anhydride, 17.1 parts of ethylene glycol, 48.4 parts of isosorbide and 7.0 parts of an adduct of 5 moles of ethylene oxide to bisphenol A were added to a reaction vessel equipped with a stirring machine, a temperature gauge, a nitrogen inlet tube, a dehydration tube and a depressurization device, and heated to a temperature of 130° C. while being stirred.

As an esterification catalyst, titanium (IV) isopropoxide was added at an amount of 0.3 parts relative to a total of 100 parts of the monomer components mentioned above, the temperature was increased to 235° C. over a period of 1 hour in a nitrogen gas stream, and a reaction was carried out for 3 hours. Polyester resin 1 was then obtained by carrying out the reaction until a desired molecular weight was achieved while depressurizing the reaction vessel to a pressure of 10.0 mmHg. At the point when the required molecular weight was reached, the reaction was terminated and polyester resin 1 was obtained. The weight average molecular weight Mw of polyester resin 1 was 50,000.

Preparation of Polyester Resin Particle-Dispersed Solution 1

Polyester resin 1: 100 parts

Methyl ethyl ketone: 60 parts

Isopropyl alcohol: 10 parts

The components listed above were placed in a reaction vessel equipped with a stirrer and dissolved at 60° C. After confirming that the components had dissolved, the reaction vessel was cooled to 35° C., and 3.5 parts of a 10% aqueous solution of ammonia was added. Next, 300 parts of ion exchanged water was added dropwise to the reaction vessel over a period of 3 hours to obtain a polyester resin particle-dispersed solution. Next, polyester resin particle-dispersed solution 1 was obtained by removing methyl ethyl ketone and isopropyl alcohol using an evaporator.

Synthesis of Polyester Resin 2

Fumaric acid: 100.0 parts

Trimellitic anhydride: 4.4 parts

Adduct of 5 moles of ethylene oxide to bisphenol A: 37.9 parts

Adduct of 5 moles of propylene oxide to bisphenol A: 36.3 parts

Polyester resin 2 was obtained in the same way as polyester resin 1, except that the monomer components used were the monomers listed above. The weight average molecular weight Mw of the obtained polyester resin 2 was 44,000.

Preparation of Polyester Resin Particle-Dispersed Solution 2

Polyester resin particle-dispersed solution 2 was prepared in the same way as polyester resin particle-dispersed solution 1, except that polyester resin 2 was used as the polyester resin.

Preparation of Styrene-Acrylic Resin Particle-Dispersed Solution

Styrene: 126 parts n-butyl acrylate: 14 parts

Anionic surfactant (sodium dodecylbenzene sulfonate): 4 parts

Ion exchanged water: 59.2 parts

Emulsified monomer liquid A was prepared by placing the components listed above in a vessel and emulsifying using a homogenizer.

Ion exchanged water: 133 parts

Anionic surfactant (sodium dodecylbenzene sulfonate): 0.6 parts

Meanwhile, the components listed above were placed in a polymerization reaction vessel, a reflux tube was attached, the components were stirred slowly stirred while introducing nitrogen, and the polymerization flask was heated to 75° C. and held at this temperature. 10 parts of emulsified monomer liquid A was added to this vessel dropwise over a period of 10 minutes using a metering pump.

Next, 1.05 parts of ammonium persulfate was dissolved in 10 parts of ion exchanged water and added dropwise to the polymerization flask dropwise over a period of 10 minutes using a metering pump. Stirring was continued for 1 hour in this state. Next, the remainder of emulsified monomer liquid A was added dropwise for a period of 2 hours using a metering pump. Once the entire amount had been added, stirring was continued for a further 3 hours to obtain a styrene-acrylic resin particle-dispersed solution.

Preparation of Wax Particle-Dispersed Solution

Hydrocarbon wax (FNP0090 produced by Nippon Seiro Co., Ltd., melting temperature Tw: 90.2° C.): 270 parts Anionic surfactant (sodium dodecylbenzene sulfonate): 10.5 parts Ion exchanged water: 700 parts A wax particle-dispersed solution was obtained by mixing the components listed above, dissolving the wax at an internal liquid temperature of 120° C. using a pressure-ejection homogenizer (a Gaulin homogenizer produced by Gaulin), carrying out a dispersion treatment for 120 minutes at a dispersion pressure of 5 MPa and then for 360 minutes at a dispersion pressure of 40 MPa, and then cooling the liquid. The volume average particle diameter D50v of particles in this wax particle-dispersed solution was 220 nm. Ion exchanged water was then added to adjust the solid content concentration to 20.0%.

Preparation of Black Colorant-Dispersed Solution

Carbon black (REGAL 330 produced by Cabot Japan): 200 parts

Anionic surfactant (sodium dodecylbenzene sulfonate): 13 parts

Ion exchanged water: 750 parts

The components listed above were placed in a stainless steel vessel having a size such that when all of the components had been placed in the vessel, the height of the liquid surface was one third of the height of the vessel, and the contents of the vessel were stirred with a stirrer until no unwetted pigment remained and then defoamed.

Following the defoaming, dispersion was carried out for 10 minutes at 5000 rpm using a homogenizer (an Ultratarax T50 produced by IKA), and the contents of the vessel were stirred for 24 hours using a stirrer and defoamed. Following the defoaming, dispersion was carried out again for 10 minutes at 6000 rpm using a homogenizer, and the contents of the vessel were stirred for 24 hours using a stirrer and defoamed.

Next, dispersion was carried out at a pressure of 240 MPa using an Ultimizer high pressure impact disperser (HJP30006 produced by Sugino Machine Limited). The dispersion was carried out equivalent to 25 passes, as calculated from the total charged amount and the treatment capacity of the apparatus.

The black colorant-dispersed solution was obtained by leaving the obtained dispersed solution to stand for 72 hours, removing precipitates, and adding ion exchanged water to adjust the solid content concentration to 15%. The volume average particle diameter D50v of particles in this colorant-dispersed solution was 110 nm.

Production of Toner 1

Production of Toner Particle 1

Polyester resin particle-dispersed solution 1:450.0 parts

Styrene-acrylic resin particle-dispersed solution: 50.0 parts

Black colorant-dispersed solution: 50.0 parts

Wax particle-dispersed solution: 50.0 parts

Sodium dodecylbenzene sulfonate: 5.0 parts

Dodecyl alcohol: 0.4 parts

The polyester resin particle-dispersed solution, the styrene-acrylic resin particle-dispersed solution, the wax particle-dispersed solution, the sodium dodecylbenzene sulfonate and the dodecyl alcohol were placed in a reactor (a 1 L flask equipped with an anchor blade having a baffle) and homogeneously mixed. Meanwhile, a mixed dispersed solution was obtained by homogeneously mixing the black colorant-dispersed solution in a 500 ml beaker and then gradually adding this to the reactor while stirring. Aggregated particles were formed by adding 0.5 parts (in terms of solid content) of an aqueous solution of aluminum sulfate dropwise while stirring the obtained mixed dispersed solution.

Following completion of the dropwise addition, the system was purged with nitrogen and then held for 1 hour at 50° C. and then for 1 hour at 55° C. The temperature was then increased to 90° C. and held for 30 minutes. Fused particles were then formed by lowering the temperature to 63° C. and maintaining this temperature for 3 hours. After this period of time, the system was cooled to 40° C. at a temperature decrease rate of 0.5° C./min, and after this cooling, the product was filtered, washed with water and dried to obtain toner particle 1, which had a weight-average particle diameter (D4) of 6.5 μm.

Production of Toner 1

1.5 parts of hydrophobic silica (RY50 produced by Nippon Aerosil Co. Ltd.) was added to 100 parts of obtained toner particle 1 and mixed using a Mitsui Henschel mixer (produced by Mitsui Miike Kakoki Corporation). Toner 1 was then prepared by sieving with a vibrating sieve having an opening size of 45 μm. Physical properties of obtained toner 1 are shown in Table 1.

Production of Toners 2 to 22

Toners 2 to 22 were obtained using production methods similar to that of toner 1, except that types and quantities of the polyester resin particle-dispersed solution, the styrene-acrylic resin particle-dispersed solution, the anionic surfactant and the monohydric aliphatic alcohol were changed so that obtained toners had physical properties shown in Table 1. Moreover, the amount of the anionic surfactant was adjusted by altering the added amount of anionic surfactant when mixing the dispersed solutions in the production of the toner particle.

Reference Example

A reference example toner was produced by following an example in Japanese Patent Application Publication No. 2005-107089 (Black toner Bk6). When the amount of monohydric aliphatic alcohol in the reference toner was measured using a head space method disclosed in Japanese Patent Application Publication No. 2005-107089, 300 ppm of octyl alcohol, which was derived from hydrolysis of n-octyl-3-mercaptopropionate used as a chain transfer agent, was detected, but this amount was 10 ppm when measured using the ethanol extraction method of the present disclosure.

TABLE 1-1

| | Toner 1 | Toner 2 | Toner 3 | Toner 4 | Toner 5 |
|---|---|---|---|---|---|
| Binder resin | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % |
| Aliphatic alcohol | Dodecyl alcohol 100 ppm | Dodecyl alcohol 50 ppm | Undecyl alcohol 250 ppm | Undecyl alcohol 250 ppm | Dodecyl alcohol 50 ppm |
| Anionic surfactant | Sodium dodecylbenzene sulfonate | Sodium tetradecylbenzene sulfonate | Sodium tetradecylbenzene sulfonate | Sodium tetradecylbenzene sulfonate | Sodium tetradecylbenzene sulfonate |
| Aliphatic alcohol/anionic surfactant molar ratio | 0.03 | 0.05 | 0.40 | 0.03 | 0.01 |
| Carbon number difference | 0 | 2 | 3 | 3 | 2 |

| | Toner 6 | Toner 7 | Toner 8 | Toner 9 | Toner 10 |
|---|---|---|---|---|---|
| Binder resin | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % |
| Aliphatic alcohol | Undecyl alcohol 280 ppm | Octanol 100 ppm | Decyl alcohol 100 ppm | Cetyl alcohol 100 ppm | Stearyl alcohol 100 ppm |
| Anionic surfactant | Sodium tetradecylbenzene sulfonate | Sodium octylbenzene sulfonate | Sodium octylbenzene sulfonate | Sodium cetylbenzene sulfonate | Sodium cetylbenzene sulfonate |
| Aliphatic alcohol/anionic surfactant molar ratio | 0.55 | 0.03 | 0.03 | 0.03 | 0.03 |
| Carbon number difference | 3 | 0 | 2 | 0 | 2 |

TABLE 1-2

| | Toner 11 | Toner 12 | Toner 13 | Toner 14 | Toner 15 |
|---|---|---|---|---|---|
| Binder resin | Polyester 1 60 mass % Styrene-acrylic resin 40 mass % | Polyester 1 40 mass % Styrene-acrylic resin 60 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % |
| Aliphatic alcohol | Dodecyl alcohol 50 ppm | Dodecyl alcohol 50 ppm | Decyl alcohol 100 ppm | Octyl alcohol 100 ppm | Stearyl alcohol 100 ppm |
| Anionic surfactant | Sodium tetradecylbenzene sulfonate | Sodium tetradecylbenzene sulfonate | Sodium polyoxyethylene lauryl ether sulfate | Sodium dodecylbenzene sulfonate | Sodium dodecylbenzene sulfonate |
| Aliphatic alcohol/anionic surfactant molar ratio | 0.05 | 0.05 | 0.03 | 0.03 | 0.03 |
| Carbon number difference | 2 | 2 | 2 | 4 | 4 |

| | Toner 16 | Toner 17 | Toner 18 | Toner 19 | Toner 20 |
|---|---|---|---|---|---|
| Binder resin | Polyester 2 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % | Polyester 1 90 mass % Styrene-acrylic resin 10 mass % |
| Aliphatic alcohol | Decyl alcohol 100 ppm | Hexanol 100 ppm | Behenyl alcohol 100 ppm | Dodecyl alcohol 10 ppm | Dodecyl alcohol 350 ppm |
| Anionic surfactant | Sodium octylbenzene sulfonate | Sodium octylbenzene sulfonate | Sodium cetylbenzene sulfonate | Sodium dodecylbenzene sulfonate | Sodium tetradecylbenzene sulfonate |

TABLE 1-2-continued

| | | | | | |
|---|---|---|---|---|---|
| Aliphatic alcohol/anionic surfactant molar ratio | 0.03 | 0.03 | 0.03 | 0.002 | 0.63 |
| Carbon number difference | 2 | 2 | 6 | 0 | 3 |

| | Toner 21 | Toner 22 |
|---|---|---|
| Binder resin | Polyester 1 90 mass % Styrene-acrylic resin 10 mass % | Polyester 2 90 mass % Styrene-acrylic resin 10 mass % |
| Aliphatic alcohol | Dodecyl alcohol 350 ppm | Dodecyl alcohol 350 ppm |
| Anionic surfactant | Sodium tetradecylbenzene sulfonate | Sodium tetradecylbenzene sulfonate |
| Aliphatic alcohol/anionic surfactant molar ratio | 0.55 | 0.55 |
| Carbon number difference | 3 | 3 |

In the tables, ppm values for aliphatic alcohols are content values (on a mass basis) for the monohydric aliphatic alcohol extracted from the toner with ethanol. The carbon number difference is the difference between the number of carbon atoms in the monohydric aliphatic alcohol and the number of carbon atoms in the alkyl group of the sodium straight chain alkylbenzene sulfonate. Sodium polyoxyethylene lauryl ether sulfate is a compound in which n=2 in formula (A).

Image Evaluations

Image evaluations were carried out using a printer obtained by modifying parts of a commercially available HP LaserJet Enterprise Color M553dn color laser printer. As a result of the modifications, the printer could be operated using only one color process cartridge. In addition, the printer was modified so that the temperature of the fixing unit could be altered to an arbitrary temperature.

Toner was removed from a black toner process cartridge fitted to this color laser printer, the inside of this process cartridge was cleaned with an air blower, a toner (350 g) was placed in the process cartridge, the process cartridge filled with the toner was attached to the color laser printer, and the following image evaluations were carried out. Specific image evaluation items are as follows.

Image-Density Irregularities

Figure 2:
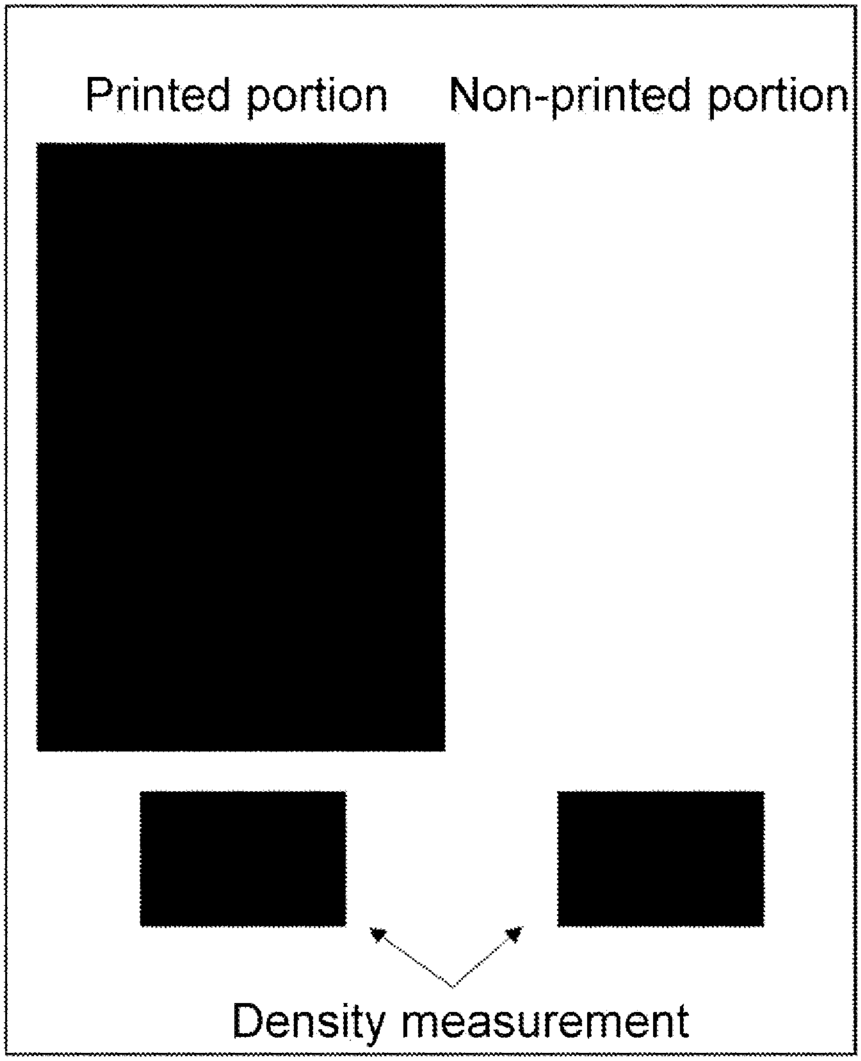
FIG. 2 is an image for evaluating image-density irregularities.

This evaluation was carried out before a printing durability test (initial) and after the printing durability test. In a high temperature high humidity environment (a temperature of 32° C. and a relative humidity of 85%), images shown in FIG. 2 were printed before and after a test comprising printing out 30,000 images with horizontal lines at a print percentage of 0.5%, and the difference in image density of solid portions below a printed portion and a non-printed portion was evaluated. A Macbeth RD918 reflection densitometer (produced by Macbeth Corp.) was used for measuring image density, and the relative density relative to a white background portion having a document density of 0.00 was measured. Letter sized plain paper (XEROX 4200 produced by XEROX, 75 g/$m^2$) was used as a transfer material.

Evaluation Criteria

A: Image density difference: less than 0.05

B: Image density difference: not less than 0.05 and less than 0.10

C: Image density difference: not less than 0.10 and less than 0.20

D: Image density difference: not less than 0.20

Fogging

After a test comprising printing out 30,000 images with horizontal lines at a print percentage of 0.5% in a high temperature high humidity environment (a temperature of 32° C. and a relative humidity of 85%), the reflectance (%) of a non-image part after printing one image (initial) and after a printing durability test was measured using a REFLECTOMETER MODEL TC-6DS (produced by Tokyo Denshoku Co., Ltd.). Fogging was evaluated using a numerical value (fogging value, %) determined by subtracting the obtained reflectance from the reflectance (%) of an unused sheet of printing paper (a reference paper), which was measured in the same way. A smaller numerical value means that image fogging is suppressed. The evaluation was carried out in glossy paper mode using plain paper (HP Brochure Paper 200 g/$m^2$, Glossy, produced by HP, 200 g/$m^2$).

Evaluation Criteria

A: Fogging less than 0.5%

B: Fogging not less than 0.5% and less than 1.5%

C: Fogging not less than 1.5% and less than 3.0%

D: Fogging not less than 3.0%

Fixing Performance

Solid images (toner laid-on level: 0.9 mg/$cm^2$) were printed at a variety of fixing temperatures on a transfer material, and fixing performance was evaluated using the criteria given below on the basis of the lowest temperature at which offsetting did not occur. Moreover, the fixing temperature is a value measured using a non-contact temperature gauge at the surface of a fixing roller. Letter sized plain paper (XEROX 4200 produced by XEROX, 75 g/$m^2$) was used as a transfer material.

Evaluation Criteria

A: No offsetting at 140° C.

B: Offsetting occurred at a temperature of not lower than 140° C. and lower than 150° C.

C: Offsetting occurred at a temperature of not lower than 150° C. and lower than 160° C.

D: Offsetting occurred at a temperature of 160° C.

Blocking (Storability)

5 g of a toner was placed in a 50 mL resin cup and left to stand for 3 days at a temperature of 60° C. and a relative humidity of 10%, after which the presence/absence of aggregated lumps was investigated and evaluated using the following criteria.

Evaluation Criteria

A: No aggregated lumps

B: Minor aggregated lumps were produced, but these disintegrated when pressed lightly with a finger.

C: Aggregated lumps were produced, and these did not disintegrate when pressed lightly with a finger.

D: Complete aggregation

Working Examples 1 to 16

In Working Examples 1 to 16, toners 1 to 16 were used as toners and subjected to the evaluations described above. The evaluation results are shown in Table 2.

Comparative Examples 1 to 6

In Comparative Examples 1 to 6, toners 17 to 22 were used as toners and subjected to the evaluations described above. The evaluation results are shown in Table 2.

TABLE 2

| | | Charging performance | | | | | |
|---|---|---|---|---|---|---|---|
| | | Image-density irregularities | | Fogging | | | |
| | | Initial | After 30,000 prints | Initial | After 30,000 prints | Fixing performance | Blocking (storability) |
| Working Example 1 | Toner 1 | A(0.01) | A(0.03) | A(0.2) | A(0.1) | A(135° C.) | A |
| Working Example 2 | Toner 2 | A(0.02) | A(0.03) | A(0.3) | A(0.3) | A(135° C.) | A |
| Working Example 3 | Toner 3 | A(0.03) | A(0.04) | A(0.3) | A(0.2) | A(135° C.) | A |
| Working Example 4 | Toner 4 | A(0.02) | A(0.03) | A(0.3) | A(0.3) | A(135° C.) | A |
| Working Example 5 | Toner 5 | B(0.07) | B(0.08) | A(0.3) | A(0.4) | A(135° C.) | A |
| Working Example 6 | Toner 6 | B(0.07) | A(0.04) | A(0.4) | B(0.8) | A(130° C.) | B |
| Working Example 7 | Toner 7 | A(0.04) | B(0.07) | A(0.4) | B(1.0) | A(135° C.) | A |
| Working Example 8 | Toner 8 | A(0.02) | A(0.03) | A(0.2) | A(0.3) | A(135° C.) | A |
| Working Example 9 | Toner 9 | A(0.03) | A(0.03) | A(0.1) | A(0.2) | A(135° C.) | B |
| Working Example 10 | Toner 10 | B(0.06) | B(0.08) | A(0.3) | A(0.4) | A(132° C.) | C |
| Working Example 11 | Toner 11 | A(0.03) | A(0.03) | A(0.1) | A(0.2) | A(138° C.) | A |
| Working Example 12 | Toner 12 | A(0.01) | A(0.02) | A(0.2) | A(0.2) | B(142° C.) | A |
| Working Example 13 | Toner 13 | C(0.12) | C(0.15) | A(0.4) | B(1.2) | A(135° C.) | A |
| Working Example 14 | Toner 14 | B(0.08) | C(0.11) | A(0.3) | B(1.1) | B(142° C.) | A |
| Working Example 15 | Toner 15 | C(0.11) | B(0.09) | A(0.4) | A(0.3) | A(132° C.) | C |
| Working Example 16 | Toner 16 | A(0.02) | A(0.03) | A(0.2) | A(0.3) | B(140° C.) | A |
| Comparative Example 1 | Toner 17 | C(0.15) | D(0.25) | C(1.8) | C(2.2) | A(135° C.) | A |
| Comparative Example 2 | Toner 18 | D(0.33) | Evaluation not possible | A(0.3) | Evaluation not possible | A(135° C.) | D |
| Comparative Example 3 | Toner 19 | D(0.22) | D(0.30) | A(0.3) | A(0.3) | A(135° C.) | A |
| Comparative Example 4 | Toner 20 | B(0.08) | D(0.20) | C(1.8) | D(4.2) | A(135° C.) | C |
| Comparative Example 5 | Toner 21 | D(0.27) | D(0.35) | B(0.8) | D(3.5) | A(135° C.) | B |
| Comparative Example 6 | Toner 22 | D(0.22) | D(0.32) | C(2.2) | D(4.5) | B(148° C.) | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-095999, filed Jun. 8, 2021, which is hereby incorporated by reference herein in its entirety.

What is claimed is:

1. A toner, comprising:

a toner particle comprising a binder resin, a monohydric aliphatic alcohol and an anionic surfactant having an alkyl group;

the binder resin consisting of (i) a polyester resin and (ii) optionally containing a styrene acrylic resin; and a carbon number of the monohydric aliphatic alcohol being 8 to 18, wherein a content of the monohydric aliphatic alcohol when extracted from the toner with ethanol is 30 to 300 ppm by mass in the toner when measured according to the following protocol (i) to (v)

(i) mixing 2 g of toner and 18 g of ethanol to produce a mixture A, (ii) irradiating the mixture A with ultrasonic waves for 5 minutes, (iii) allowing the mixture A to stand overnight in a constant temperature chamber at 60° C. after irradiation with ultrasonic waves, and further allowing the mixture A to stand at room temperature for three additional days, (iv) filtering a supernatant of the mixture A after standing through a PTFE syringe filter (pore diameter 250 nm) to obtain a filtrate A, and (v) analyzing the filtrate A by gas chromatography to obtain the content of the monohydric aliphatic alcohol extracted from the toner with ethanol, and a value of a ratio (molar ratio) of the monohydric aliphatic alcohol extracted from the toner with ethanol when measured according to the protocol (i) to (v) relative to the anionic surfactant having an alkyl group extracted from the toner with methanol when measured according to the following protocol (vi) to (ix) is 0.01 to 0.60

(vi) mixing 1 g of toner and 10 g of methanol to produce a mixture B, (vii) treating the mixture B for 20 minutes in an ultrasonic cleaner held at a water temperature of 30° C.±2° C., (viii) filtering off the mixture B treated with the ultrasonic cleaner to obtain a filtrate B, and (ix) analyzing the filtrate B by high performance liquid chromatography to obtain the content of the anionic surfactant having an alkyl group extracted from the toner with methanol.

2. The toner according to claim 1, wherein a content of the polyester resin in the binder resin is 50 mass % or more.

3. The toner according to claim 1, wherein the anionic surfactant having an alkyl group is represented by R—X—$SO_3^-Na^+$ when R is an alkyl group having 8 to 18 carbon atoms, X is a single bond, —O—, a phenylene group or —$(OCH_2CH_2)_n$—, and n is 2 to 10.

4. The toner according to claim 1, wherein the anionic surfactant having an alkyl group comprises a sodium straight chain alkylbenzene sulfonate.

5. The toner according to claim 4, wherein a difference between the carbon number of the monohydric aliphatic alcohol and a carbon number of the alkyl group of the sodium straight chain alkylbenzene sulfonate is 3 or less.

6. The toner according to claim 1, wherein the polyester resin comprises a monomer unit represented by formula (1)

(1)

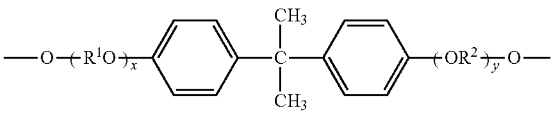

when $R^1$ and $R^2$ are independently an ethylene group or a propylene group, x and y are each 0 to 8, and the sum of x and y is 0 to 16, and a content of the monomer unit represented by formula (1) in the polyester resin is 5.0 mass % or less.

7. The toner according to claim 1, wherein the monohydric aliphatic alcohol has a carbon number of 10 to 16.

8. The toner according to claim 1, wherein the content of the monohydric aliphatic alcohol extracted from the toner with ethanol is 40 to 270 ppm by mass in the toner.

9. The toner according to claim 1, wherein the value of the ratio (molar ratio) of the monohydric aliphatic alcohol extracted from the toner with ethanol relative to the anionic surfactant having an alkyl group extracted from the toner with methanol is 0.02 to 0.45.

* * * * *